(12) United States Patent
Syed

(10) Patent No.: US 10,578,239 B2
(45) Date of Patent: Mar. 3, 2020

(54) HIGH PRESSURE TEST PLUG

(71) Applicant: CHERNE INDUSTRIES INCORPORATED, Minneapolis, MN (US)

(72) Inventor: Asim Syed, Minneapolis, MN (US)

(73) Assignee: Cherne Industries Incorporated, Minneapolis, MN (US)

( * ) Notice: Subject to any disclaimer, the term of this patent is extended or adjusted under 35 U.S.C. 154(b) by 0 days.

(21) Appl. No.: 15/999,367

(22) PCT Filed: Feb. 15, 2017

(86) PCT No.: PCT/US2017/017861
§ 371 (c)(1),
(2) Date: Aug. 16, 2018

(87) PCT Pub. No.: WO2017/142886
PCT Pub. Date: Aug. 24, 2017

(65) Prior Publication Data
US 2019/0113167 A1    Apr. 18, 2019

Related U.S. Application Data

(60) Provisional application No. 62/296,062, filed on Feb. 16, 2016.

(51) Int. Cl.
*F16L 55/134* (2006.01)
*F16L 55/128* (2006.01)

(52) U.S. Cl.
CPC ......... *F16L 55/134* (2013.01); *F16L 55/1286* (2013.01)

(58) Field of Classification Search
CPC ............................ F16L 55/134; F16L 55/1286
USPC ............................................. 138/93, 89, 90
See application file for complete search history.

(56) References Cited

U.S. PATENT DOCUMENTS

| | | | |
|---|---|---|---|
| 2,681,706 A * | 6/1954 | Pottorf | E21B 33/1243 277/333 |
| 3,958,607 A * | 5/1976 | Gray | F16L 55/1645 138/97 |
| 4,191,217 A * | 3/1980 | Kadono | F16L 33/01 138/109 |

(Continued)

*Primary Examiner* — Craig M Schneider
*Assistant Examiner* — David R Deal
(74) *Attorney, Agent, or Firm* — BakerHostetler

(57) ABSTRACT

The present invention relates to an expandable plug structure for use in high pressure applications. The expandable plugs, such as pneumatic plugs, are preferably constructed of a multi-layered, reinforced elastomeric cylindrical body, i.e., of reinforced natural rubber, and having an inflator member at one end. The multi-layers include various rubber layers, rubber coated aramid, which subsequent to vulcanization provides a unitary plug with shoulders that resist delamination. The cylindrical body may incorporate metal end plates as well as end plate weldment structures which cooperate with a high pressure flow-through conduit which allows the completed high pressure test plug to simultaneously seal a pipeline and to direct fluid therethrough. The high pressure plug obtains its strength in part based upon high frictional resistance forces generated by the external rubber layer(s), and further by the manner in which the external rubber layer8s) are molded into the metallic structures in the plug.

16 Claims, 8 Drawing Sheets

(56) References Cited

U.S. PATENT DOCUMENTS

| | | | |
|---|---|---|---|
| 4,458,721 A * | 7/1984 | Yie | F16K 7/10 137/318 |
| 4,614,206 A * | 9/1986 | Mathison | F16K 7/10 138/93 |
| 4,852,614 A | 8/1989 | Johansen et al. | |
| 5,202,266 A | 5/1993 | Hiemsoth | |
| 5,404,946 A * | 4/1995 | Hess | E21B 33/1275 166/187 |
| 5,413,136 A | 5/1995 | Prescott | |
| 5,503,188 A * | 4/1996 | Petrone | F16L 55/124 138/121 |
| 6,116,286 A * | 9/2000 | Hooper | F16L 55/115 138/90 |
| 6,446,669 B1 * | 9/2002 | Lundman | F16L 55/134 138/91 |
| 6,481,465 B1 * | 11/2002 | Warmerdam | F16L 55/1283 138/89 |
| 7,153,057 B1 * | 12/2006 | Lucas | E02D 29/14 404/25 |
| 7,597,118 B1 | 10/2009 | Peterson et al. | |
| 9,417,153 B2 * | 8/2016 | Parker | G01M 3/20 |
| 10,392,896 B1 * | 8/2019 | Vanderlans | E21B 33/1277 |
| 2004/0216794 A1 | 11/2004 | Beckey et al. | |

\* cited by examiner

HIGH PRESSURE TEST PLUG

CROSS-REFERENCE TO RELATED APPLICATIONS

This application is the National Stage Application of International Patent Application No. PCT/US2017/017861 filed Feb. 15, 2017, which claims the benefit of priority of U.S. Provisional Application No. 62/296,062, filed Feb. 16, 2016, the entire contents of both of which are incorporated herein by reference.

TECHNICAL FIELD

The present disclosure relates to high pressure test plugs for the facilitation of testing pipelines subject to high backpressure loads.

BACKGROUND

Pipelines are generally known to transport fluids (liquids or gases) over a physical distance within the internal cavities of the constituent individual pipe sections. In order to test the pipeline or to make occasional repairs or alterations to the pipeline, it is disruptive and/or undesirable to shut off the flow of fluid through the pipeline during the period of testing or repair. Rather, a plumbing technician will utilize a test plug, having a diameter similar to the inner diameter of the pipeline, to wholly or partially obstruct the pipeline. Once obstructed, testing or repairs may be performed downstream from the location where the test plug is obstructing the pipeline.

In certain applications involving a pipeline transporting fluids at high backflow pressures, there is an increased difficulty and risk with wholly or partially obstructing the pipeline. Namely, due to the higher pressure in the pipeline, traditional test plugs are at a heightened risk for failure resulting from the higher load it must withstand. The test plug could experience an "application failure" wherein the plug does not maintain its position within the pipeline (i.e., it is prone to sliding). Alternatively, the test plug could experience "design failure", where the materials of the plug will separate from one another. Depending on the type of design failure, damage to the pipeline and/or injuries to the plumbing technician are possible. Existing test plugs are insufficient for use in high backflow pressure pipelines because they are structurally unsound and prone to failure.

Therefore, there is a need for a test plug that is structurally adapted for use with high pressure pipeline, particularly around 150 pounds per square inch (psi). There is further a need for a test plug that can adequately be inflated to a high internal pressure and maintain structural integrity such that it may be used in a high backflow pressure pipeline.

The present invention provides a high pressure plug capable of withstanding increased loads and forces found in higher backflow pressure pipelines. In particular, the invention relates to a unique structure for a high pressure test plug that provides this capability. The invention is further capable of sustaining a sufficiently high internal pressure so as to be capable of use in these high backflow pressure pipelines, while also maintaining its structural integrity to due to a robust design.

The high pressure test plugs of the invention may be multi-size test plugs which are constructed and arranged to be inflated and used to seal interior portions of pipelines, having a specified diameter range, for testing, repair, and construction purposes. In particular, the high pressure test plugs of the invention may be expandable, multi-size high pressure test plugs for use in pipelines of various ranges, such as, for example, 4-8 inch inner-diameter pipe ranges, 8-12 inch inner-diameter pipe ranges, 12-16 inch inner-diameter pipe ranges, 20-26 inch inner-diameter pipe ranges, and 26-32 inch inner-diameter. The high pressure test plugs of the invention are preferably constructed of layered and reinforced elastomeric materials, metal endplates, metal rings, and an inflation member. The high pressure test plugs may further include a high pressure resistant flow-through conduit that is capable of creating a bypass through the high pressure test plug capable of withstanding the high inflation pressure within a chamber of the test plug.

SUMMARY OF THE INVENTION

The present invention relates to an expandable plug structure for use in high pressure applications. The expandable plugs, such as pneumatic plugs, are preferably constructed of a multi-layered, reinforced elastomeric cylindrical body, i.e., of reinforced natural rubber, and having an inflator member at one end. The multi-layers include various rubber layers, rubber coated aramid, which subsequent to vulcanization provides a unitary plug with shoulders that resist delamination. The cylindrical body may incorporate metal end plates as well as end plate weldment structures which cooperate with a high pressure flow-through conduit which allows the completed high pressure test plug to simultaneously seal a pipeline and to direct fluid therethrough. The high pressure plug obtains its strength in part based upon high frictional resistance forces generated by the external rubber layer(s), and further by the manner in which the external rubber layer(s) are molded into the metallic structures in the plug.

Further embodiments of the plug may additionally comprise biaxial nylon cording.

A method of manufacturing non-high pressure test plugs may be generally understood with reference to U.S. Publication No. 2004/0216794, which disclosure is incorporated herein by reference.

A high pressure test plug according to a first embodiment seals a pipeline transporting fluids at high pressures. The test plug includes a tubular outer section having a diameter D and being generally elongate along an axis, the tubular outer section extending between opposed first and second ends having a length L defined therebetween as measured along a first direction parallel to the axis. The test plug includes first and second metal plates disposed at the first and second ends respectively, the first and second plates each defining a circular body having an outer diameter further defined by respective first and second outer edges, wherein the first and second plates are aligned along the axis. The test plug further includes first and second metal rings disposed at the first and second ends respectively, the first and second rings each defining a generally toroidal-shaped body having an exterior surface, the body further having an inner portion defining an inner diameter and an outer portion defining an outer diameter that is substantially equal to the outer diameter of each of the first and second plates, the first and second rings each being aligned along the axis, wherein the first ring is disposed adjacent to the first plate and the second ring is disposed adjacent to the second plate. The test plug further includes a rubber sheet partially defining the tubular outer section, the rubber sheet having first and second opposed sides, wherein a first part of the rubber sheet extends from a centrally disposed portion beyond the first and second outer edges of the plate, through the inner portions of the first and second rings, and a second part of the rubber sheet extends around the respective exterior surfaces and past the respective outer portions of the first and second rings back toward the centrally disposed portion, such that the first part of the rubber sheet frictionally engages the second part of the rubber sheet along a distance X measured along the first direction, wherein the distance X is greater than 5 inches. The test plug further includes a series of rubber pads connectable and securable to the first and second plates at the respective first and second ends, the series of rubber pads sealingly engaging the rubber sheet at the inner portions of the first and second rings so as to define a central chamber of the test plug, wherein the central chamber is configured to be inflated at a high pressure so as to stretch the rubber sheet and thereby increase the diameter D of the test plug.

In a further aspect of the invention, the distance X may be greater than 5 inches but less than ¼ of the distance L. In yet a further aspect, the distance X may be greater than ¼ L but less than ½ L. In another aspect, the distance X may be greater than ½ L, but less than ½ L+⅛ L. In a further aspect, the distance X may be substantially equal to ½ L+⅛ L.

DETAILED DESCRIPTION OF THE DRAWINGS

Figure 1:
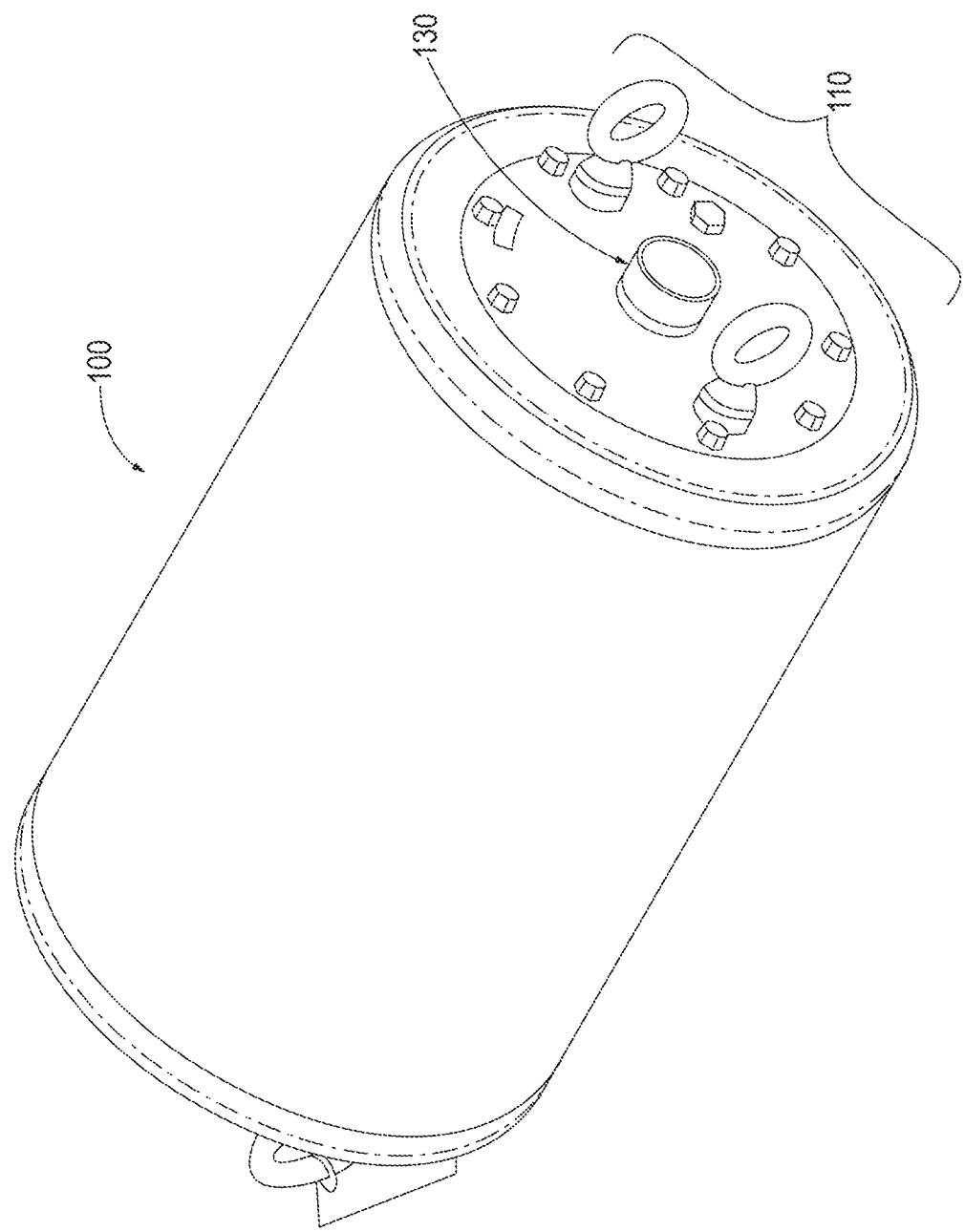
FIG. 1 is a perspective view of a completed high pressure test plug in accordance with a first embodiment.
Figure 2:
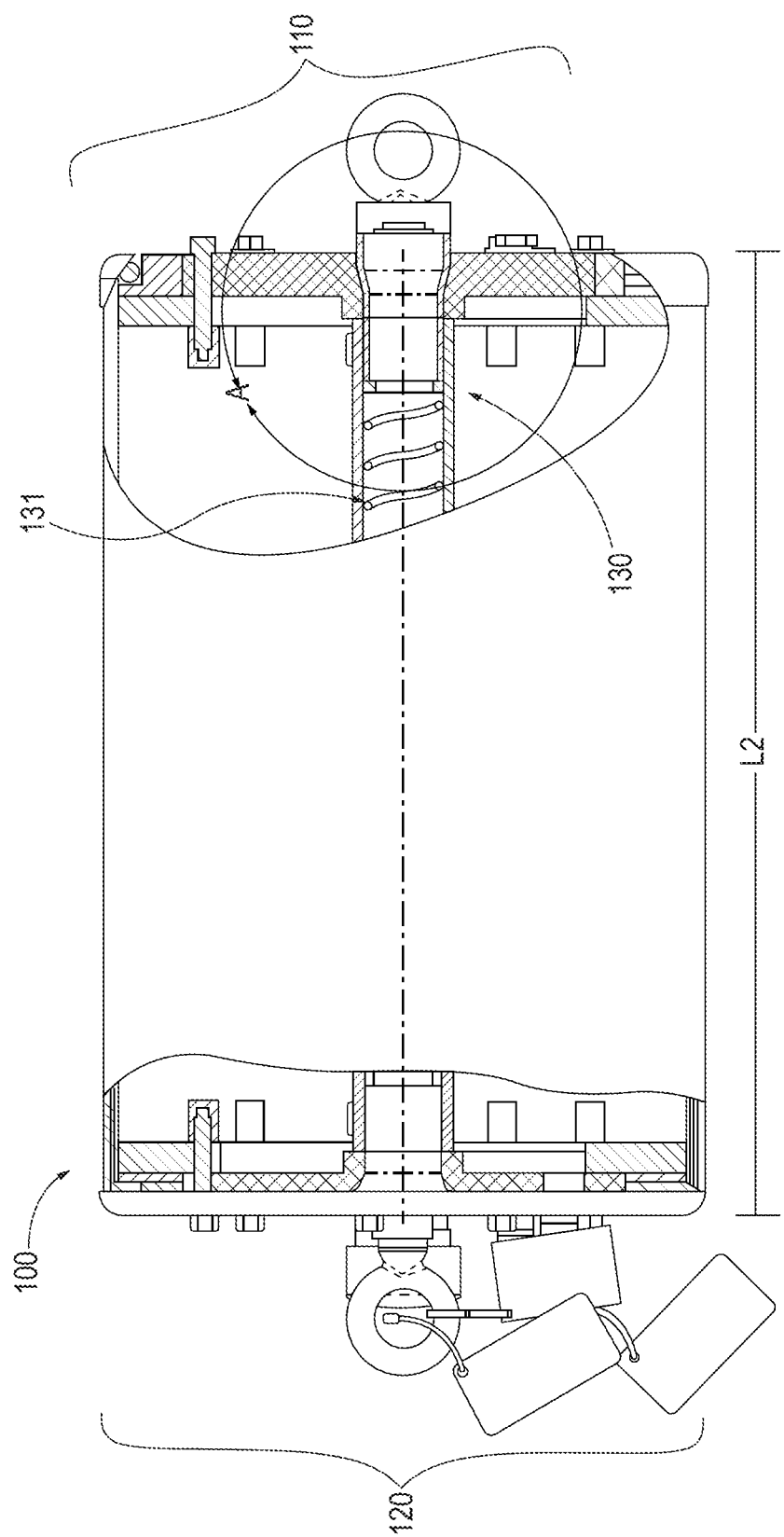
FIG. 2 is a side sectional view of the completed high pressure test plug of FIG. 1.

FIGS. 1-2 depict a first embodiment of a high pressure test plug 100 for sealing a pipeline transporting fluids at high pressures. The test plug 100 is sized and configured to be inserted into a pipeline so as to wholly or partially obstruct the flow of fluid through the pipeline such that testing, construction, or repairs may be performed on the pipeline downstream from the test plug 100. Thus, the test plug 100 forms a tight, water-proof seal with an internal surface area of the pipeline, which is defined by an inner diameter of the pipeline. More particularly, and as will be discussed in greater detail below, the test plug 100 is adapted to wholly or partially obstruct the flow of fluid(s) through the pipeline that are flowing under "high pressures". In a first aspect, it is contemplated that the test plug 100 will be suitable to be used in pipelines having high backflow pressures, which are generally understood to be backflow pressures greater than 100 pounds-per-square-inch ("psi"). The test plug 100 as described, however, may be capable of use in pipelines having backflow pressures in the pipeline of up to and including 150 psi. The test plug 100 may further be capable of use in pipelines having backflow pressures of as much as 250 psi, which will also be considered within the scope of the invention.

The embodiment of the test plug 100 illustrated in FIGS. 1-2 is a "completed" test plug, ready to be installed in a pipeline. Notably, the test plug 100 in "completed" form includes endplate structures 110 and 120 and flow-through conduit 130, as will all be discussed in greater detail below.

FIGS. 3-6 illustrate various views of the test plug 100 shown in FIGS. 1-2, except prior to installation of the endplate structures 110, 120, prior to installation of the flow-through conduit 130, and prior to vulcanization of the test plug 100.

Figure 3:
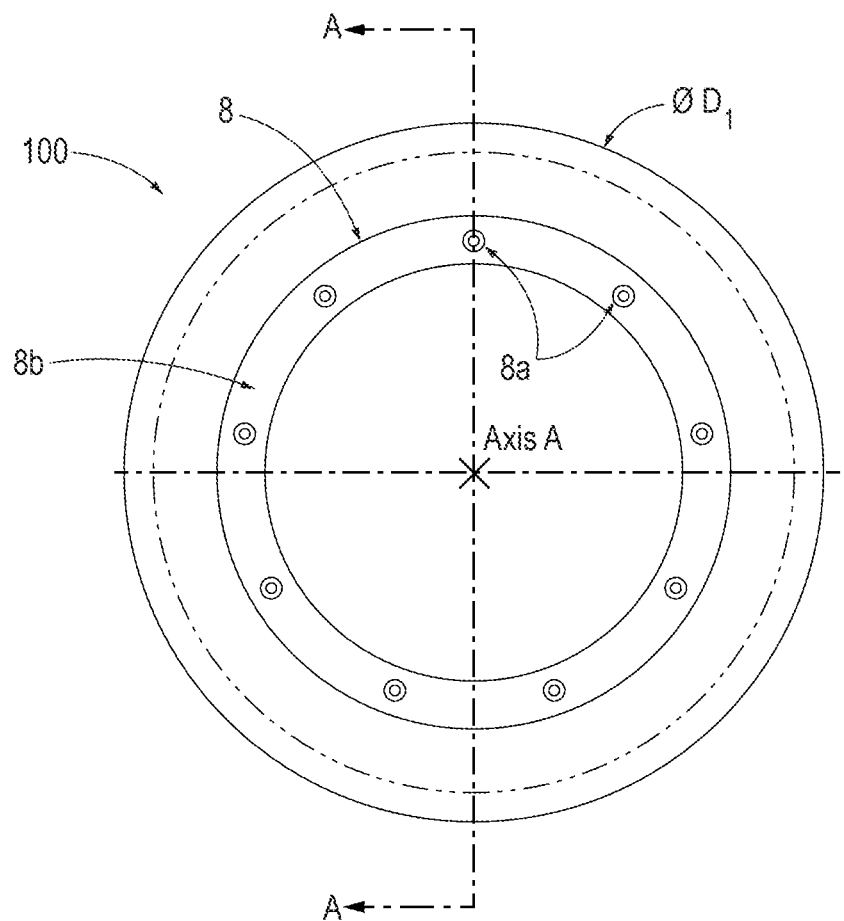
FIG. 3 is a front view of a non-completed high pressure test plug in accordance with the first embodiment.

As illustrated particularly in FIG. 3, the test plug 100 has a generally cylindrical shape. The test plug 100 is elongate along axis A, which extends centrally through the plug, from a first end 11 to a second end 12. The test plug 100 includes a tubular outer section that extends along the axis A from the first end 11 to the second end 12 by a distance L along a first direction that is generally parallel to the axis A. The tubular outer section comprises a plurality of elastomeric (or rubber) layers—internal rubber layer 1, rubber sheet 2, and external rubber layer 1'—disposed one on top of the other (see FIG. 5).

Referring first to FIG. 3, the test plug 100 defines an outer diameter $D_1$ as shown. In order to create a tight seal with the internal surface area of the pipeline, the diameter $D_1$ will be increased upon inflation of the test plug 100 to closely match the inner diameter of the pipeline. As will be explained in further detail below, the test plug 100 is configured to be inflated so as to define a multi-range test plug. In other words, the test plug 100 may be inflated such that the diameter $D_1$ of the plug may be increased by, for example, 4-6 inches, to conform to a greater range of internal diameters of the pipeline, although other ranges of inflation are contemplated. This provides the benefit that a single-size test plug 100 may be versatile to accommodate many differently sized pipes up to a maximum inflation diameter $D_{1max}$ for a given plug. Another benefit is that inflating the test plug 100, thereby increasing the diameter $D_1$ will enable the test plug 100 to conform to any number of surface irregularities on the internal surface area of the pipeline in order to provide the necessary water-proof seal.

Figure 4:
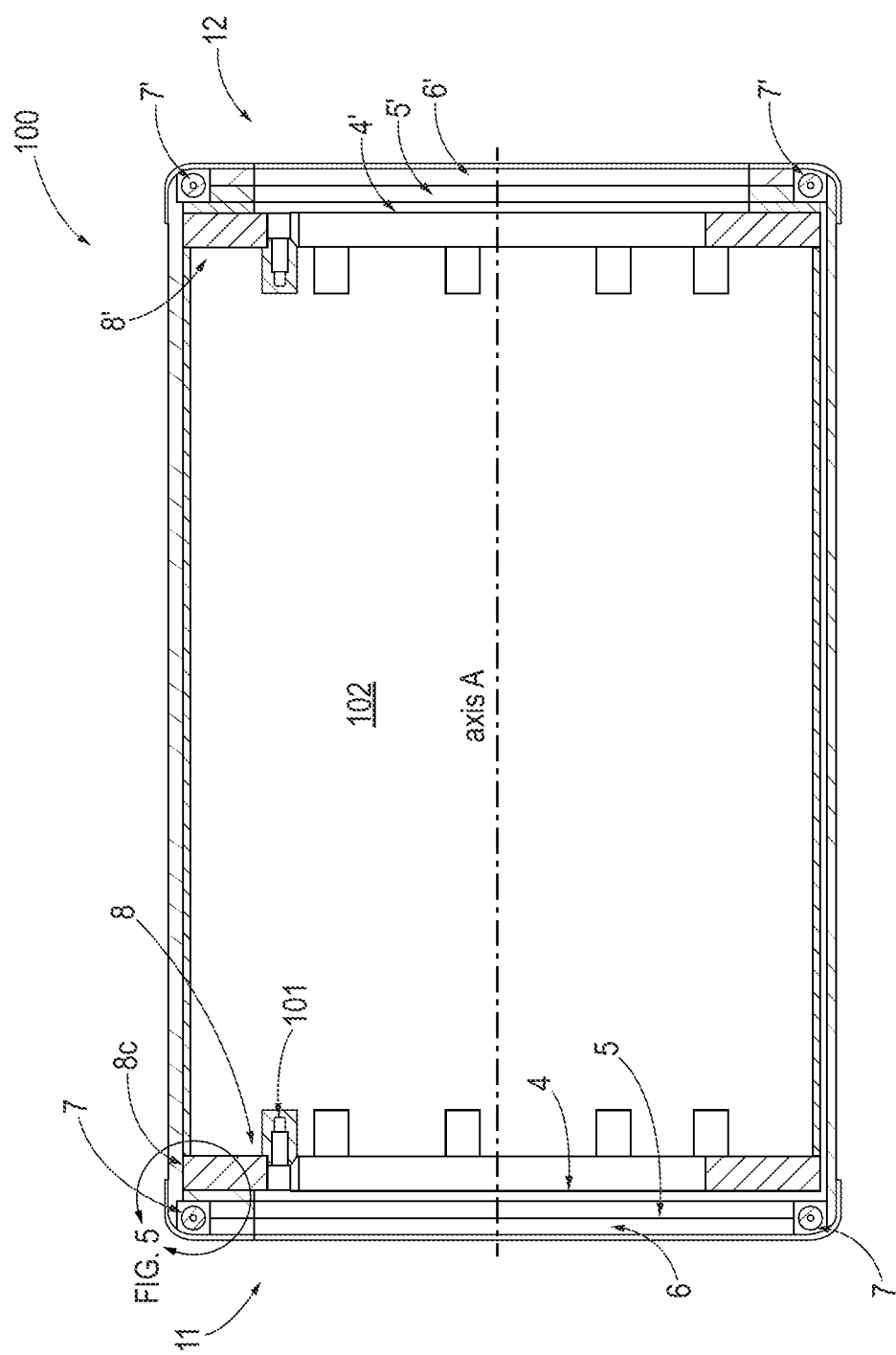
FIG. 4 is a longitudinal, cross-sectional view of the high pressure test plug illustrated in FIG. 3, taken along the line A-A as shown in FIG. 3.

As further illustrated in FIG. 3, the first end 11 of the test plug 100 defines a first metal plate 8. The first metal plate 8 may be made of steel, or any other suitable metal having similar strength characteristics known in the art may be substituted without departing from the scope of the invention. The first metal plate 8 defines a first circular body having an outer diameter $OD_1$ and an inner diameter as shown, wherein the outer diameter $OD_1$ of the first metal plate 8 is further defined by a first outer edge $8_c$ (see FIG. 4). The first metal plate 8 includes a plurality of apertures $8_a$ disposed around a periphery of an outer-facing surface $8_b$ of the first metal plate 8. The apertures $8_a$ are configured to receive a plurality of complementary bolts 101 (see FIG. 4) so as to positionally fix the endplate structure 110 (see FIGS. 1-2) so as to seal the test plug 100. As shown in FIG. 4, the test plug 100 at the first end 11 further includes a series of elastomeric (e.g., rubber) pads 4, 5, and 6 (see FIG. 4) so as to facilitate the seal of the test plug 100 when the endplate structure 110 is bolted onto the plate 8 by bolts 101. Although as illustrated in FIG. 1, the first metal plate 8 includes six apertures $8_a$, it is contemplated that any number of apertures may be used to seal the endplate structure 110 to the first end 11 of the test plug 100. It is further contemplated that the first metal plate 8 may contain no apertures 8*b* and may instead include other sealing mechanisms so as to effectively seal the endplate structure 110 to the first end 11. Such sealing mechanisms may include, but are not limited to glues, sealants, clips, fasteners, or any other suitable sealing mechanism known in the art. While the elastomeric pads 4, 5, and 6 will ideally comprise rubber, it is further contemplated that the elastomeric pads 4, 5, and 6 may comprise any other elastomeric material having similar structural characteristics to rubber without departing from the scope of the invention.

FIG. 4 depicts a longitudinal, cross-sectional view of the test plug 100 shown in FIG. 3. As illustrated, the cross section is taken along lines A-A shown in FIG. 3. As shown in FIG. 4, the second end of test plug 12 defines a second metal plate 8' having a similar configuration to the first metal plate 8. The second metal plate 8' may be made of steel, or any other suitable metal having similar strength characteristics known in the art may be substituted without departing from the scope of the invention. The second metal plate 8' defines a second circular body having an outer diameter $OD_1'$, wherein the outer diameter $OD_1'$ of the second metal plate 8 is further defined by a second outer edge U. The second plate 8' also includes a plurality of apertures (not shown) that are configured to receive a plurality of complementary bolts 101 so as to positionally fix endplate structure 120 so as to seal the test plug 100 at the second end 12. The test plug 100 at the second end 12 further includes a series of elastomeric (e.g., rubber) pads 4', 5', and 6' in order to facilitate sealing the second end 12 of the test plug 100 with the endplate structure 120 (see FIGS. 1-2). With both the first end 11 and second end 12 sealed by the series of elastomeric pads 4, 5, 6 and 4', 5', and 6' (respectively), along with the endplate structures 110 and 120, the test plug 100 defines an inner chamber (or cavity) 102 (see FIG. 4). While the elastomeric pads 4', 5', and 6' will ideally comprise rubber, it is further contemplated that the elastomeric pads 4', 5', and 6' may comprise any other elastomeric material having similar structural characteristics to rubber without departing from the scope of the invention.

An inflation port (not illustrated) may be selectively inserted into one of the first and second ends 11, 12 of the test plug 100 (such as, for example, through the endplate structures 110 or 120, shown in FIGS. 1-2) so as to provide a passageway into the inner cavity 102. The inflation portion may be used to fill the inner cavity 102 with an inflation medium such as water to obtain an internal pressure in the cavity 102 of up to 200 psi. It is contemplated that the cavity 102 of the test plug 100 may be filled to other pressures as may become necessary in a given plumbing application, including up to and including 250 psi. It is further contemplated that the cavity 102 of the test plug 100 may be inflated with air, water, or some other medium known in the art to cause the diameter D1 of the test plug 100 to increase to the desired inner diameter of the pipeline, such that the inner diameter of the pipeline is less than or equal to $D_{1max}$, as described above.

With continuing reference to FIG. 4, the test plug 100 additionally comprises first and second metal rings 7 and 7' disposed at the respective first and second ends 11 and 12 when the test plug 100 is in an assembled configuration. The first and second metal rings 7, 7' each have a generally toroidal-shaped body defining an exterior surface. The toroidal-shaped body of each ring 7 and 7' defines a circular cross section that is swept about a circle having a center that is disposed on the axis A when the test plug 100 is in the assembled configuration. The rings 7 and 7' each have an inner portion defining an inner diameter and an outer portion defining an outer diameter that is substantially equal to the outer diameter $OD_1$ of each of the first and second plates 8, 8'. Importantly, the first and second metal rings 7, 7' are "floating" with respect to the first and second plates 8, 8' and with respect to one another. In other words, the first and second metal rings 7 and 7' are not positionally fixed relative to one another or to either of the metal plates 8 and 8'. This aspect allows the first and second metal rings 7, 7' to alter their position(s) or orientation(s) as needed to distribute excessive or imbalanced internal or external pressures on the test plug 100. The first and second metal rings 7, 7' may be made of welded steel, or any other suitable metal having similar strength characteristics known in the art may be substituted without departing from the scope of the invention.

Figure 5:
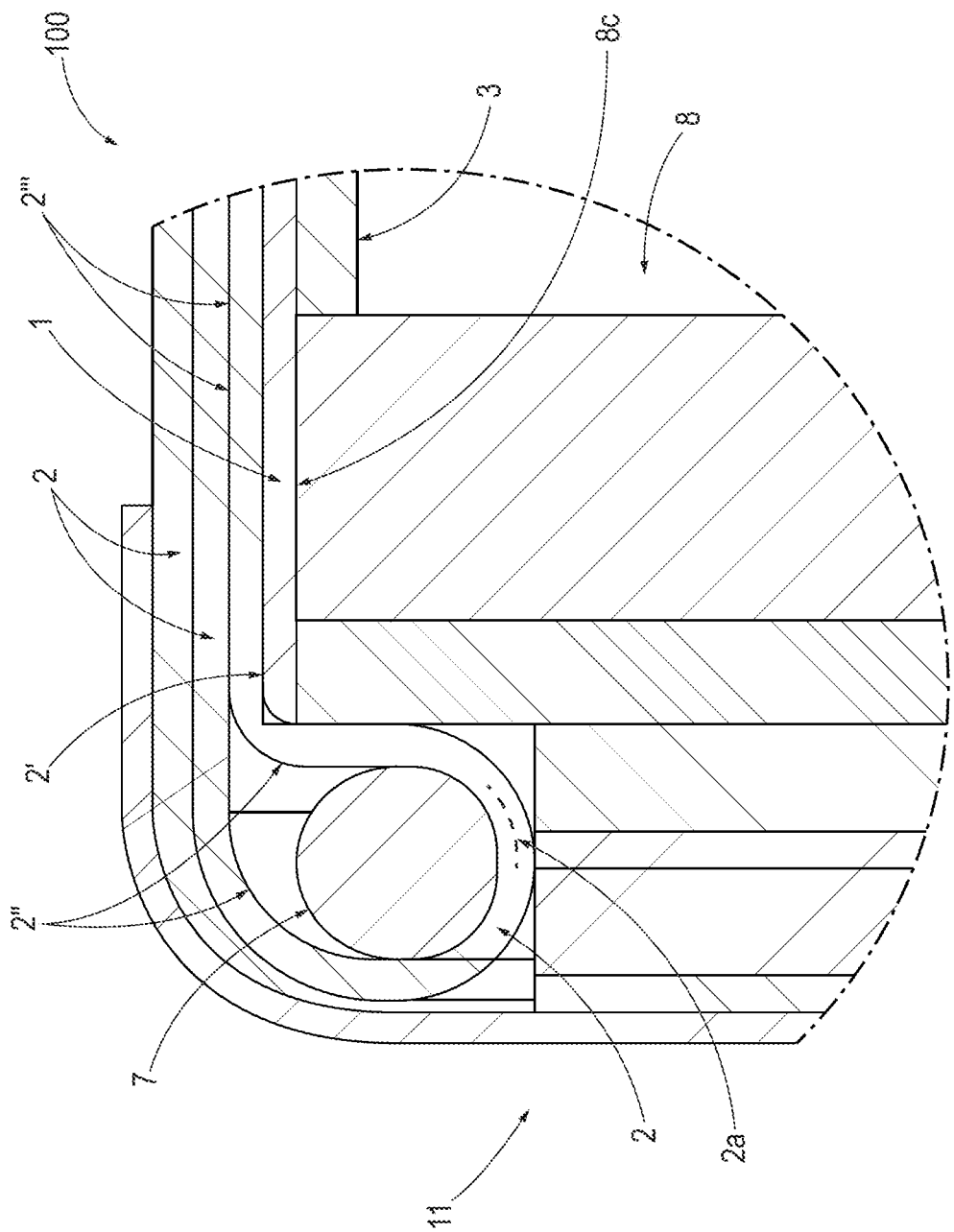
FIG. 5 is a detailed view of a portion of the high pressure test plug illustrated in FIGS. 3-4, showing the circular portion B illustrated in FIG. 4.

With reference now to FIG. 5, a portion of the test plug 100 indicated by the detail circle B near the first end 11, (see FIG. 4) is illustrated in greater detail. As shown in FIG. 5, the plurality of rubber layers 1, 2, and 1' of the tubular outer section are partially disposed on top of a cardboard tube 3. As will be described in greater detail below, the cardboard tube 3 facilitates manufacturing of the test plug 100. With continuing reference to FIGS. 4-5, cardboard tube 3 defines an inner-most layer of the tubular outer section of the test plug 100 relative to the axis A. The cardboard tube 3 has a cylindrical body that extends between the first metal plate 8 at the first end 11 to the second metal plate 8' at the second end 12. Moving outwardly from the axis A, inner rubber layer 1 is disposed on top of the cardboard tube 3; the inner rubber layer 1 having a cylindrical body that extends along the first outer edge $8_c$, of the first metal plate 8, along the cardboard tube 3, and along the second outer edge $8_c'$ of the second metal plate 8'.

Moving further outwardly from the axis A and with continuing reference to FIG. 5, rubber sheet 2 is disposed on top of inner rubber layer 1. Rubber sheet 2 defines a cylindrical sleeve having first and second opposed sides 2', 2". The rubber sheet 2 comprises an aramid fiber material $2_a$ built into the rubber sheet 2. The aramid fiber material $2_a$ comprises a series of aligned, parallel aramid fibers which provide an additional measure of structural integrity to the rubber sheet 2 when the rubber sheet 2 is subjected to excessive or imbalanced internal or external pressures on the test plug 100. The individual aramid fibers generally extend from the first end 11 to the second end 12 of the test plug 100 when the test plug 100 is in the assembled configuration. In an embodiment, the fibers may extend along a direction that is parallel to the first direction. As shown in FIG. 5, the first side 2' of the rubber sheet 2 may abut an outer surface of the inner rubber layer 1. The rubber sheet 2 may extend along a second direction, substantially opposite the first direction, beyond the first plate 8 and toward the first end 11 of the test plug 100. The rubber sheet 2 may further extend downwardly and through the inner portion of the first metal ring 7. It may then wrap around the first metal ring 7 such that the second side 2" abuts the exterior surface of the first metal ring 7. The rubber sheet 2 may then extend past the outer portion of the first ring 7 and back along the first direction such that the second side 2" of the rubber sheet 2 extends along and on top of the second side 2" of the rubber sheet 2 at an engaged portion 2'", which itself extends along the second direction as described above. In other words, the rubber sheet 2 extends along the rubber layer 1, through the ring 7, and back onto itself.

With reference now to FIG. 4, the rubber sheet 2 extends back onto itself at the engaged portion 2', such that a first part of the rubber sheet 2 (on the second side 2") sheet frictionally engages a second part of the rubber sheet 2 (also on the second side 2") at the engaged portion 2' for a distance X measured along the first direction. The distance X is generally greater than 4 or 5 inches, and it may be ¼ of the total length L of the test plug 100. The distance X may be up to ½ of the total length L of the test plug 100 (½ L), such that the portions of the rubber sheet 2 extending from the first end 11 and the second end 12 of the test plug 100 meet in a central location along the tubular outer section so as to overlap one another at the central location. In yet another aspect, X may represent a distance ½ L+⅛ L, such that the degree of overlap as described previously is further increased so as to further increase the frictional strength at the engaged portion 2'''. Different distances X as described above are all contemplated within the scope of the invention. As explained in greater detail below, the distance X is importantly tied to the frictional force imparted on the rubber sheet 2, which is to say that the increased frictional force is directly proportional to an increased value of the distance X.

Finally, and moving further outwardly from the axis A, and with reference to FIG. 5, the outer rubber layer 1 is disposed on top of the first side 2' of the rubber sheet.

Referring once again to FIG. 4, although not shown in a detailed view, the second end 12 of the test plug 100 embodies the same characteristics, arrangement, and structurally connectivity with regard to the rubber layer 1, the rubber sheet 2, and the outer rubber layer 1' as described above with respect to the first end 11.

The engaged portion 2''' serves a very important role in the test plug 100 to maintain the structural integrity of the test plug 100 when it is subjected to excessive or imbalanced internal and external pressures. Due to the proportion of the distance X being generally greater than ¼ of the total length L, the frictional force between the engaged second sides 2", 2" of the rubber sheet 2 can amount to a significant impedance to the separation of the rubber sheet 2 or the adjacent rubber layers 1, 1' from the outer tubular section of the test plug 100. This force, in parts, helps prevent the failure of the test plug 100 when it is subjected to excessive internal and external forces. As the total internal volume of the test plug increase with inflation—or as it increases with choice of larger diameter test plugs, as described further below in the second embodiment—the internal pressure can pose a significant safety concern. In addition to the frictional force obtained by virtue of the engaged portion 2''', significant structural integrity is provided to the rubber sheet 2 by virtue of the metal rings 7 and 7'. More specifically, because the rubber sheet 2 extends through and around the metal rings 7 and 7', further mechanical, structural integrity is imparted to the test plug 100 to resist failure due to the application of excessive internal and external pressure. For example, when the inner cavity 102 of the test plug 100 is inflated with water up to 200 psi, the diameter $D_1$ of the test plug 100 is increased, causing the inner rubber layer 1, rubber sheet 2, and outer rubber layer 1' to stretch and expand. Because rubber sheet 2 is wrapped through and around the metal rings 7 and 7', the rubber sheet 2 is clamped by the metal to further and additionally resist separation from the test plug 100. In combination, the frictional force imparted by the engaged portion 2''' and the rubber sheet 2 clamped by the metal rings 7 and 7', the test plug 100 is more failure resistant when utilized in high pressure pipelines in plumbing applications.

Referring to FIG. 4, the series of elastomeric pads 4, 5, and 6 at the first end 1, and 4', 5', and 6' at the second end, are fitted onto the first and second metal plates 8 and 8' and are bolted to the metal plates 8, 8' (as discussed above) to form a tight water-proof seal and to create the cavity 102. The series of elastomeric pads 4, 5, 6, 4', 5', and 6' additionally function to "top off" the first and second ends 11, 12 so as to make them flush with the rubber sheet 2 (as it wraps around the metal rings 7, 7') and the outer rubber layer 1' disposed on the rubber sheet 2. In other words, the addition of the elastomeric pads at each of the first and second ends 11, 12 square the ends away with the rubber materials forming the outer tubular section to result in a relatively smooth and even outer surface area of the test plug 100.

Referring back now to FIGS. 1-2, the "completed" test plug 100 having the endplate structures 110 and 120 and the flow-through conduit 130. The flow-through conduit 130 provides an internal passageway through the completed test plug 100 after it has been sealed by endplate structures 110 and 120. The flow-through conduit 130 functions as a bypass to allow a controlled amount of fluid, as determined by the plumbing technician, to pass through the test plug 100 as needed in a given testing, repair, or construction operation while utilizing the inflated test plug 100. As shown particularly in FIG. 2, the flow-through conduit 130 is reinforced with spring member 131. Spring member 131 structurally reinforced the passageway in the flow-through conduit 130 such that when the cavity 102 of the test plug 100 is filled with water (or other inflation medium) up to the 200 psi pressure level, the flow through conduit 130 will not collapse or otherwise be affected by the high pressure.

Figure 6:
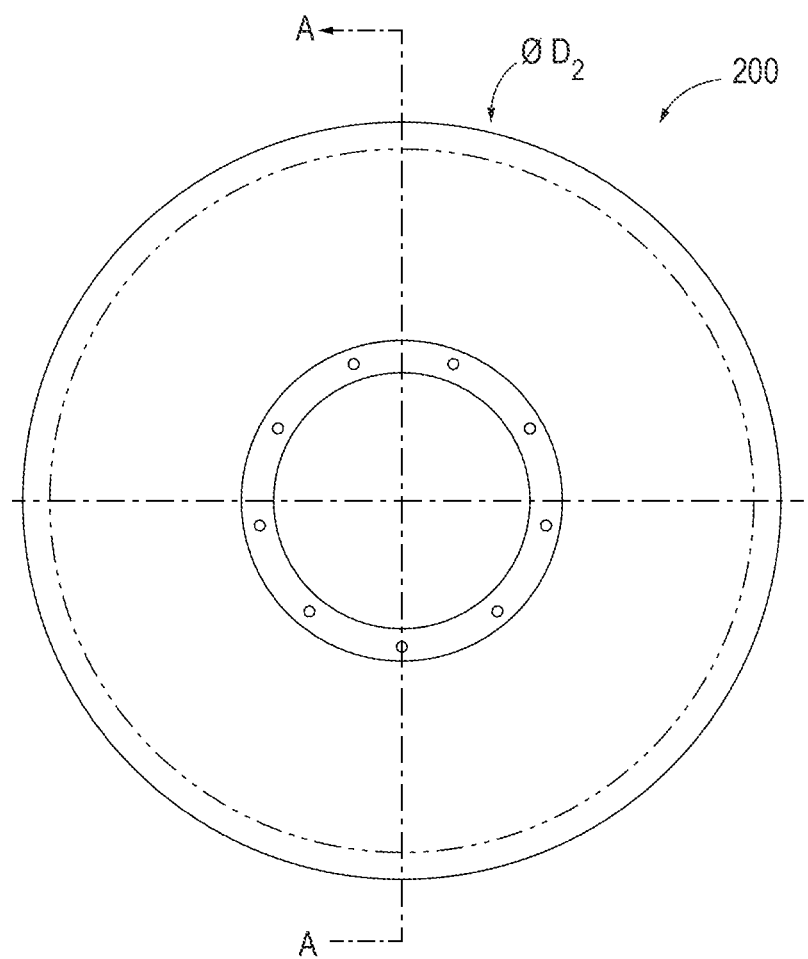
FIG. 6 is a side view of a non-completed high pressure test plug in accordance with a second embodiment.
Figure 7:
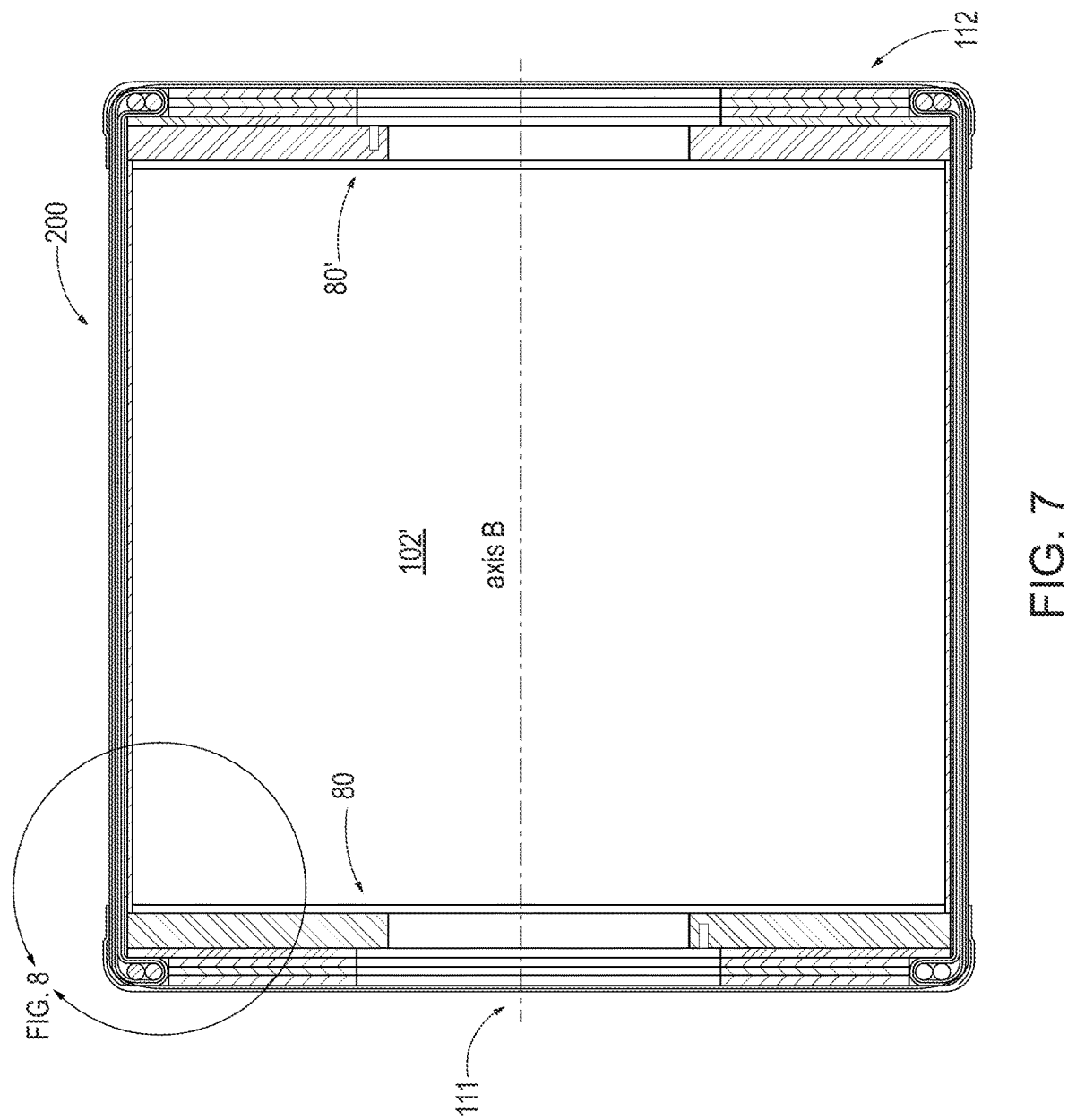
FIG. 7 is a longitudinal, cross-sectional view of the high pressure test plug illustrated in FIG. 6, taken along the line A-A as shown in FIG. 6
Figure 8:
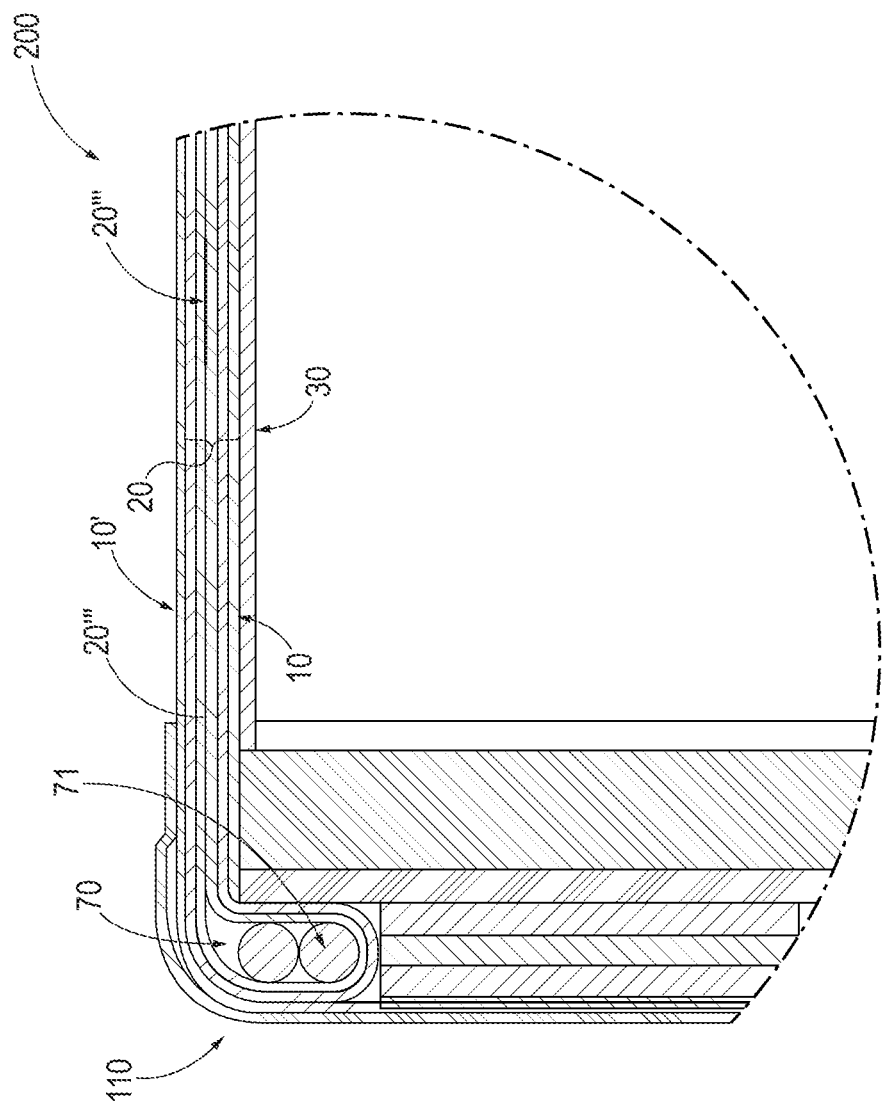
FIG. 8 is a detailed view of a portion of the high pressure test plug, illustrated in FIGS. 4-5, showing the circular portion B illustrated in FIG. 7.

FIGS. 6-8 depict a second embodiment of a high pressure test plug 200 for sealing a pipeline transporting fluids at high pressures, the test plug 200 having an outer tubular section and being elongate along an axis B. The test plug 200 is structurally similar to the test plug 100 as described above, with some exceptions as will be noted below.

Unlike the test plug 100, test plug 200 of the second embodiment has a larger diameter $D_2$, as shown in FIG. 6. Thus, as shown in FIG. 7, the internal cavity 102' represents a larger volume than the internal cavity 102 of the first embodiment of the test plug 100. Because the test plug 200 is still inflated with the same pressure of 200 psi in order to increase the diameter $D_2$ to the inner diameter of the pipeline (up to $D_{2max}$), the total force exerted on the test plug 200 will be greater than that of test plug 100. As such, additional reinforcement structures may be employed, as will be described below, to maintain the structural integrity of the test plug 200.

With reference now to FIGS. 7-8, the test plug 200 includes first and second metal plates 80, 80' at respective first and second ends 111 and 112. With particular reference to FIG. 8, the test plug 200 includes two metal rings 70, 71. The rings, like the rings 7, 7', are toroidal-shaped and each define an inner portion, an exterior surface, and an outer portion. The rings 70, 71 each have an outer diameter and an inner diameter with respect to the axis B. As shown, the ring 71 has a smaller outer diameter than the ring 70, and the rings are concentrically disposed relative to one another about the axis B. The rings 70, 71 are integrally connected to one another by welding at various locations about the periphery of the rings.

Similar to the test plug 100 as described above, the test plug 200 may include various layers of rubber that form the outer tubular section. Starting closest to the axis B and working outwardly away from the axis B, the outer tubular section of test plug B may include inner rubber 10, rubber sheet 20, and outer rubber layer 10'. Similar to the test plug 100, as shown in FIG. 8, the rubber sheet 20 may extend along the inner portion of ring 71, around the exterior surfaces of both rings 70, 71 and around the outer portion of ring 70, such that the rubber layer 20 extend back on top of itself so as to create an engaged portion 20'''. Similar to the engaged portion 20''' described above with regard to the test plug 100, the engaged portion 20''' will manifest a frictional engagement of a second part of the rubber sheet 20 with a first part of the rubber sheet 20 at the engaged portion 20''' for a distance Y measured along a third direction defined by the axis B. The distance Y is generally greater than 4 or 5 inches, and it may be ¼ of the total length L2 of the test plug 200. The distance Y may alternatively be up to ½ of the total length L2 of the test plug 200, such that the portions of the rubber sheet 20 extending from the first end 111 and the second end 112 of the test plug 200 meet in a central location along the tubular outer section so as to overlap one another at the central location. In yet another aspect, Y may represent a distance ½ L2+⅛ L2, such that the degree of overlap as described previously is further increased so as to further increase the frictional strength at the engaged portion 20'''. Different distances Y as described above are all contemplated within the scope of the invention in relation to the second embodiment of test plug 200.

Similar to the test plug 100, in the test plug 200, the engaged portion 20''' serves a very important role of maintaining the structural integrity of the test plug 200 when it is subjected to excessive or imbalanced internal and external pressures. Due to the proportion of the distance Y being generally greater than ¼ of the total length L2, the frictional force generated by the engaged portion 20''' can amount to a significant impedance to the separation of the rubber sheet 20 or the adjacent rubber layers 10, 10' from the outer tubular section of the test plug 200. This force, in parts, helps prevent the failure of the test plug 200 when it is subjected to excessive internal and external forces. As the total internal volume of the test plug increase with inflation—or as it increases with choice of larger diameter test plugs, as described further below in the second embodiment—the internal pressure can pose a significant safety concern. In addition to the frictional force obtained by virtue of the engaged portion 20''', significant structural integrity is provided to the rubber sheet 20 by virtue of the metal rings 70 and 71. More specifically, because the rubber sheet 20 extends through and around the metal rings 70, 71, further mechanical, structural integrity is imparted to the test plug 100 to resist failure due to the application of excessive internal and external pressure. For example, when the inner cavity 102' of the test plug 200 is inflated with water up to 200 psi, the diameter $D_2$ of the test plug 200 is increased, causing the inner rubber layer 10, rubber sheet 20, and outer rubber layer 10' to stretch and expand. Because rubber sheet 20 is wrapped through and around the metal rings 70, 71, the rubber sheet 20 is clamped by the metal to further and additionally resist separation from the test plug 200. In combination, the frictional force imparted by the engaged portion 20''' and the rubber sheet 20 clamped by the metal rings 70, 71, the test plug 200 is more failure resistant when utilized in high pressure pipelines in plumbing applications.

The addition of two rings 70, 71 in the test plug 200 may be important to increase the structural rigidity of the test plug 200. Due to the strength characteristics of the metal material of the rings 70, 71, which may be steel, the clamping effect described above may be even stronger to resist separation of the rubber sheet 20 from the test plug 200 under extreme pressure conditions.

What is claimed is:

1. A test plug for sealing a pipeline transporting fluids at high pressures, the test plug including a tubular outer section having a diameter D and being generally elongate along an axis, the tubular outer section extending between opposed first and second ends having a length L defined therebetween as measured along a first direction parallel to the axis, the test plug comprising:

first and second metal plates disposed at the first and second ends respectively, the first and second plates each defining a circular body having an outer diameter further defined by respective first and second outer edges, wherein the first and second plates are aligned along the axis;

first and second metal rings disposed at the first and second ends respectively, the first and second rings each defining a generally toroidal-shaped body having an exterior surface, the body further having an inner portion defining an inner diameter and an outer portion defining an outer diameter that is substantially equal to the outer diameter of each of the first and second plates, the first and second rings each being aligned along the axis, wherein the first ring is disposed adjacent to the first plate and the second ring is disposed adjacent to the second plate;

a rubber sheet partially defining the tubular outer section, the rubber sheet having first and second opposed sides, wherein a first part of the rubber sheet extends from a centrally disposed portion beyond the first and second outer edges of the plates, through the inner portions of the first and second rings, and a second part of the rubber sheet extends around the respective exterior surfaces and past the respective outer portions of the first and second rings back toward the centrally disposed portion, such that the first part of the rubber sheet frictionally engages the second part of the rubber sheet along a distance X measured along the first direction, wherein the distance X is greater than 5 inches;

a series of rubber pads connectable and securable to the first and second plates at the respective first and second ends, the series of rubber pads sealingly engaging the rubber sheet at the inner portions of the first and second rings so as to define a central chamber of the test plug, wherein the central chamber is configured to be inflated at a high pressure so as to stretch the rubber sheet and thereby increase the diameter D of the test plug.

2. The test plug of claim 1, wherein the distance X is between 5 inches and ¼ L.

3. The test plug of claim 1, wherein the distance X is between ¼ L and ½ L.

4. The test plug of claim 1, wherein the distance X is between ½ L and ½ L+⅛ L.

5. The test plug of claim 1, wherein the rubber sheet comprises a fiber reinforced material to further increase a structural rigidity of the rubber sheet.

6. The test plug of claim 5, wherein the fiber reinforced material comprises an aramid material.

7. The test plug of claim 6, wherein the aramid material comprises individual fibers that run parallel to one another along the length of the rubber sheet in the first direction.

8. The test plug of claim 1, further comprising endplate structures at the first and second ends, wherein the endplate structures are configured to be secured to the first and second metal plates so as to seal the test plug and thereby define an inner cavity.

9. The test plug of claim 8, wherein the test plug is configured to be inflated via an inflation port disposed on one of the endplate structures.

10. The test plug of claim 9, wherein the test plug is configured to be inflated with water so as to fill the inner cavity with the water, wherein the test plug is configured to define an internal pressure in the inner cavity of 200 psi.

11. The test plug of claim 8, wherein the test plug further comprises a flow-through conduit configured to extend through the endplate structures and through the inner cavity of the test plug so as to create a bypass.

12. The test plug of claim 11, wherein the flow-through conduit includes a spring member configured to provide structural support to the flow-through conduit when inner cavity is inflated with an inflation media.

13. The test plug of claim 1, wherein the tubular outer section further comprises an inner rubber layer and an outer rubber layer, wherein the inner rubber layer is disposed adjacent the rubber sheet closer to the axis, and wherein the outer rubber layer is disposed adjacent the rubber sheet more outward from the axis than the rubber sheet.

14. The test plug of claim 1, wherein the first metal ring and the second metal ring each comprise a pair of concentric rings welded to one another.

15. The test plug of claim 14, wherein a first pair of the concentric rings comprises ring A and ring B, each having an outer diameter, wherein the outer diameter of ring A is greater than the outer diameter of ring B.

16. The test plug of claim 15, wherein the rubber sheet wraps through an inner portion of ring B, around an exterior surface of both rings A and B, around an outer portion of ring A, and back onto the second portion so as to form the engaged portion.

\* \* \* \* \*